Figure 1:
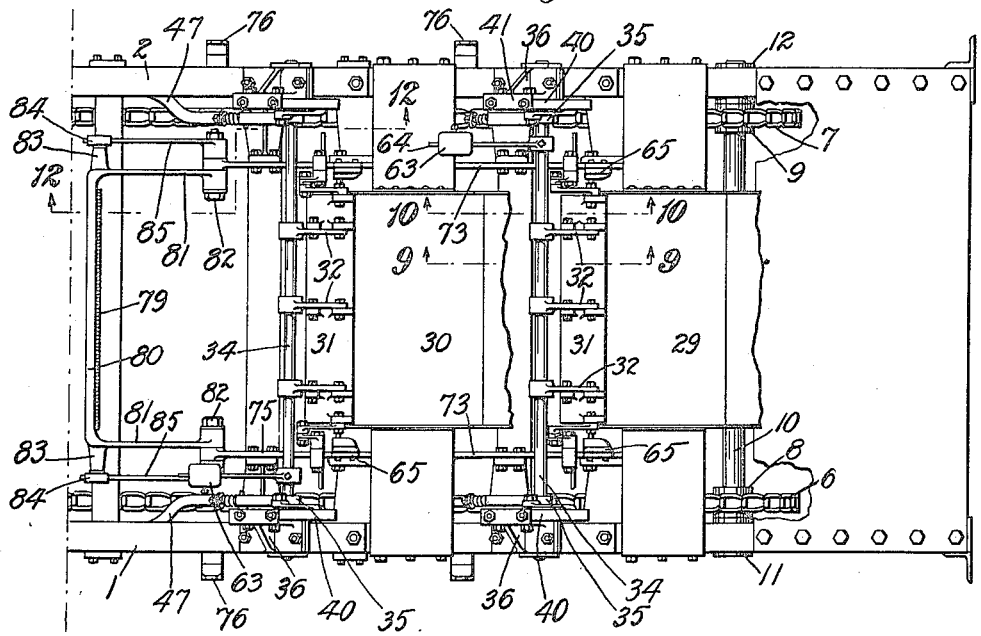

A. P. O'BRIEN & J. A. ALLEN.
DEFIBRATING MACHINE.
APPLICATION FILED JULY 5, 1912.

1,075,266.

Patented Oct. 7, 1913.
10 SHEETS—SHEET 1.

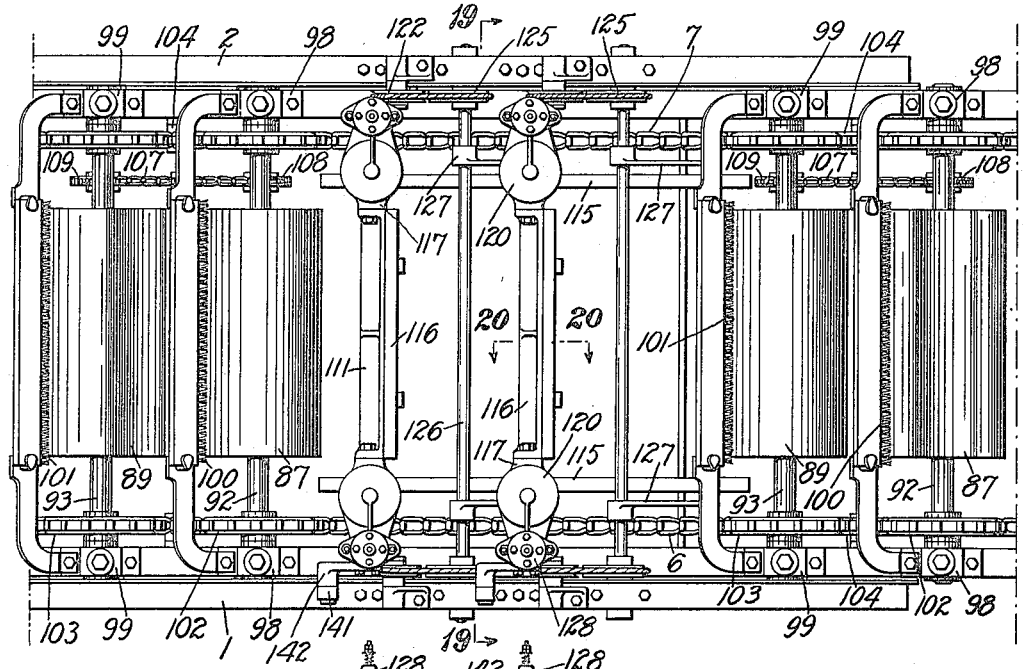
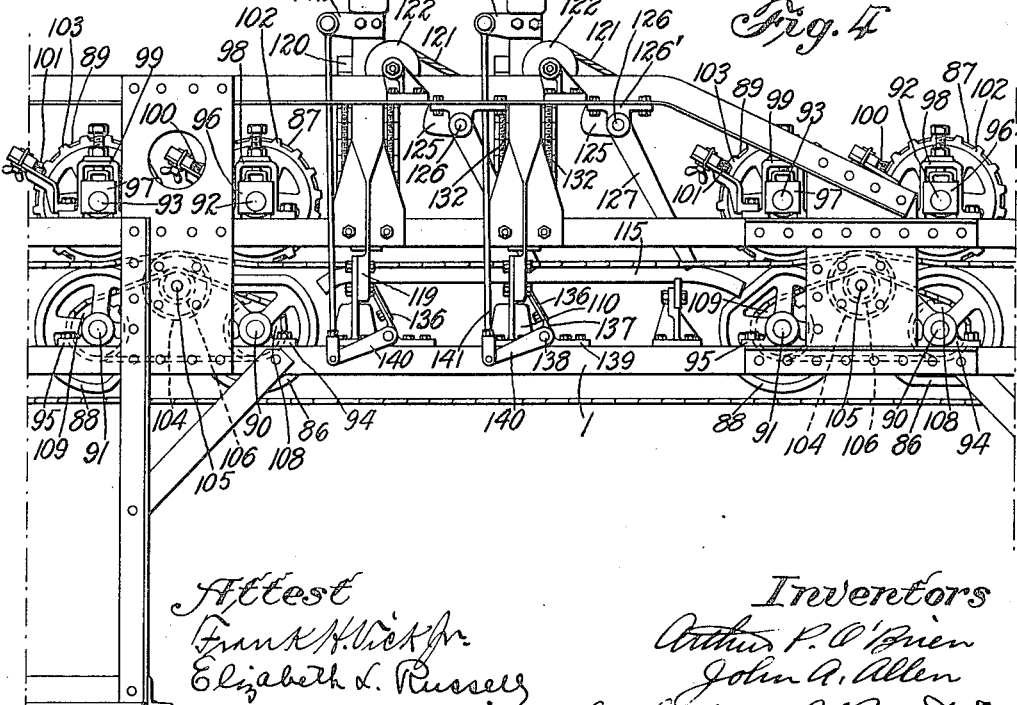

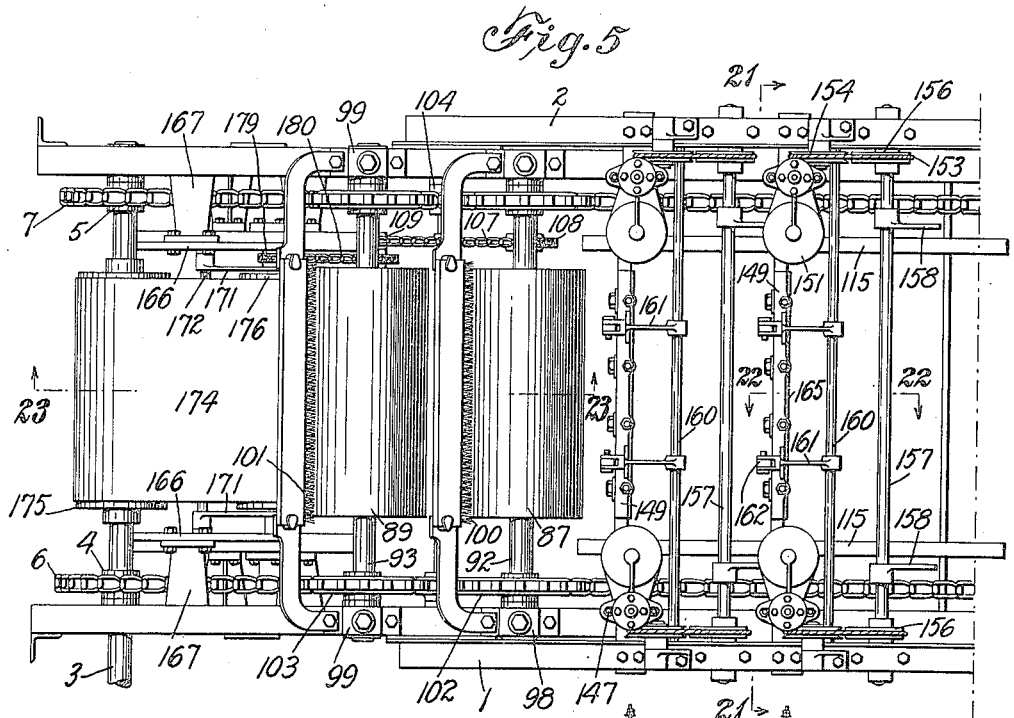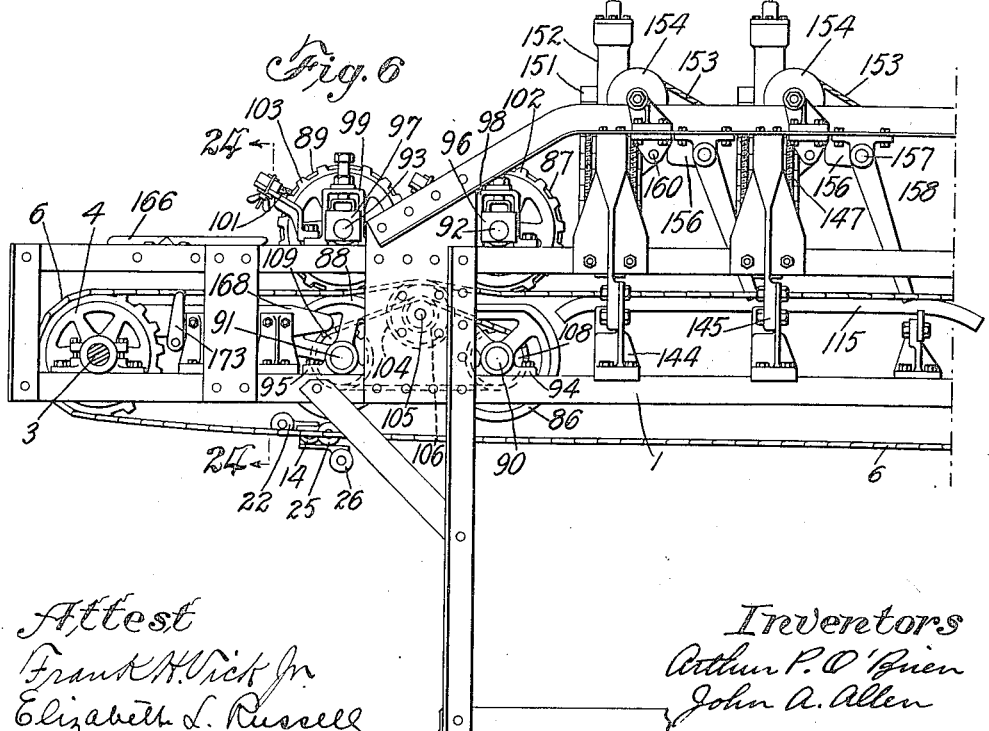

A. P. O'BRIEN & J. A. ALLEN.
DEFIBRATING MACHINE.
APPLICATION FILED JULY 5, 1912.
1,075,266.
Patented Oct. 7, 1913.
10 SHEETS—SHEET 4.
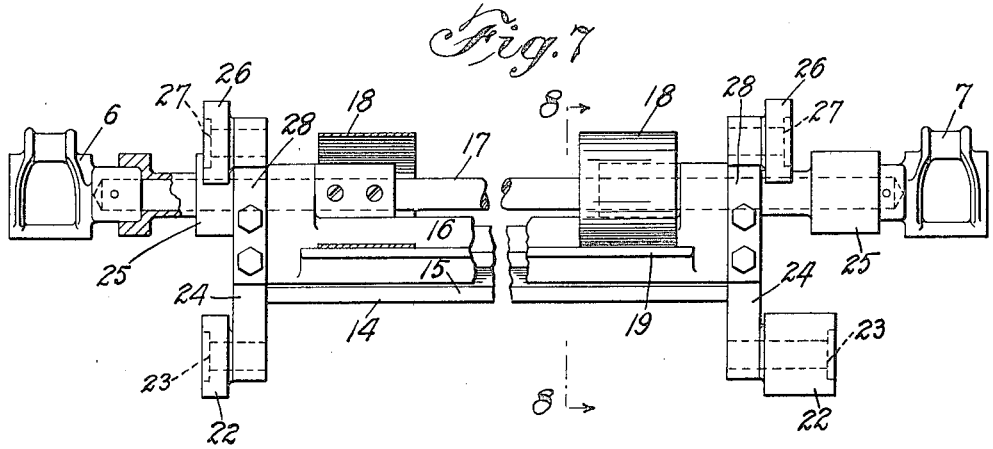
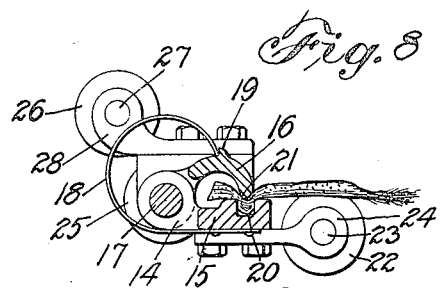
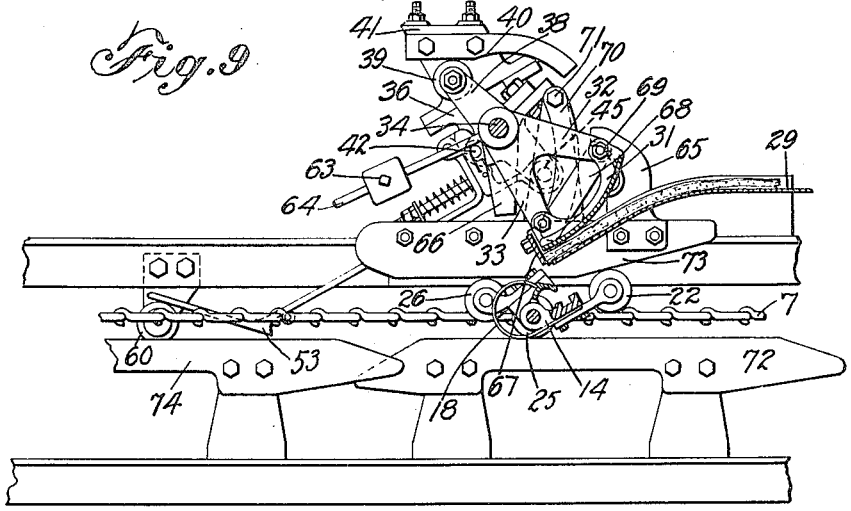

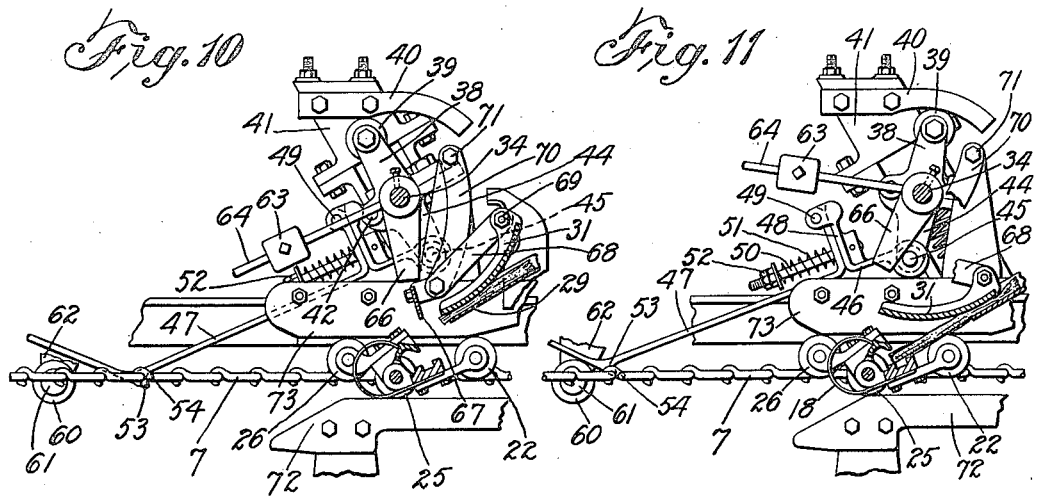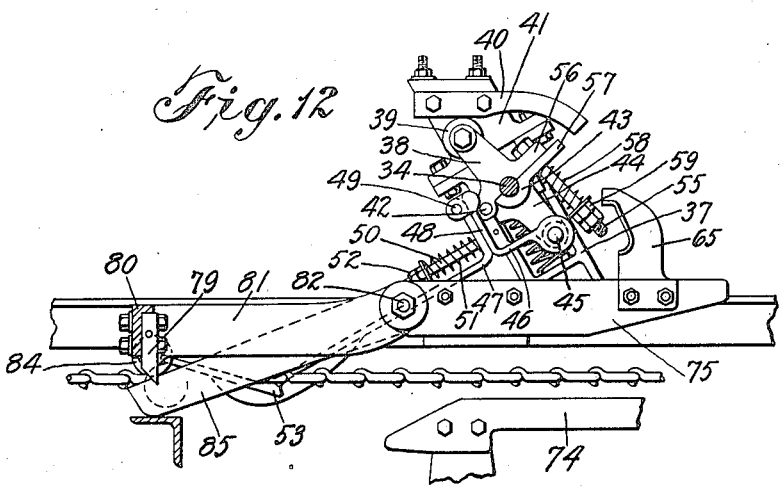

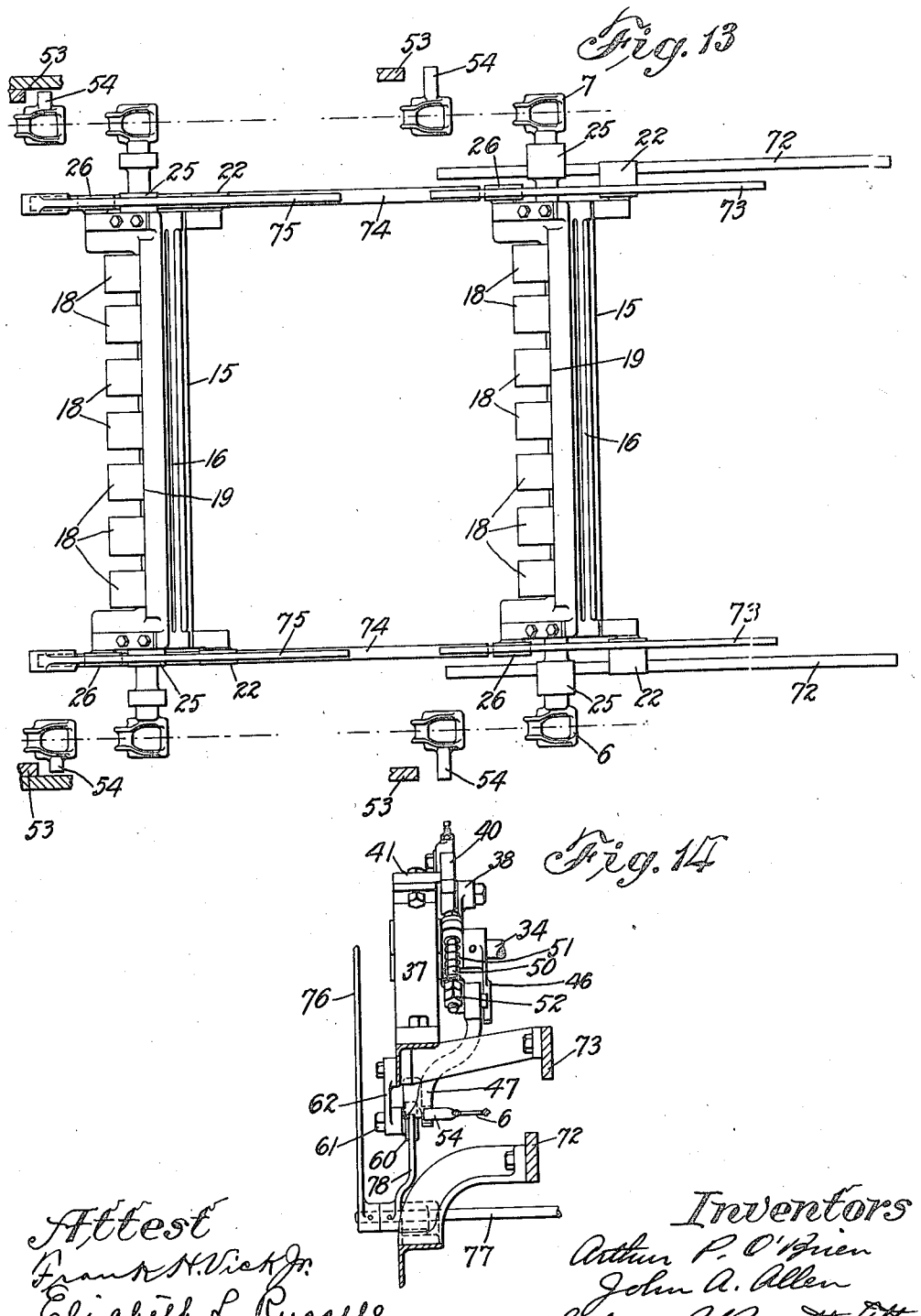

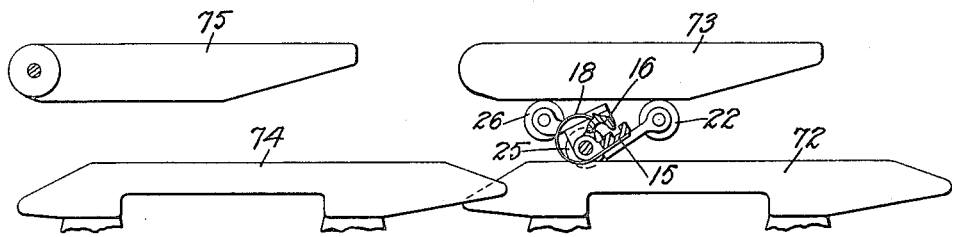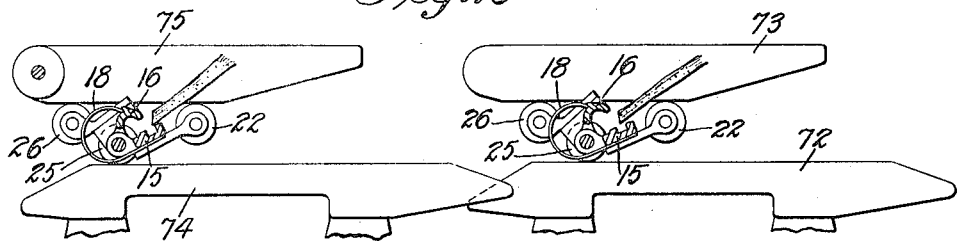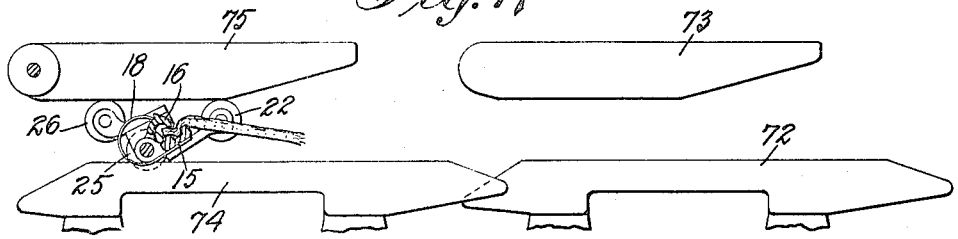

A. P. O'BRIEN & J. A. ALLEN.
DEFIBRATING MACHINE.
APPLICATION FILED JULY 5, 1912.

1,075,266.

Patented Oct. 7, 1913.
10 SHEETS—SHEET 8.

Attest
Frank H. Vick Jr.
Elizabeth L. Russell

Inventors
Arthur P. O'Brien
John A. Allen
by Sydney Prescott Atty

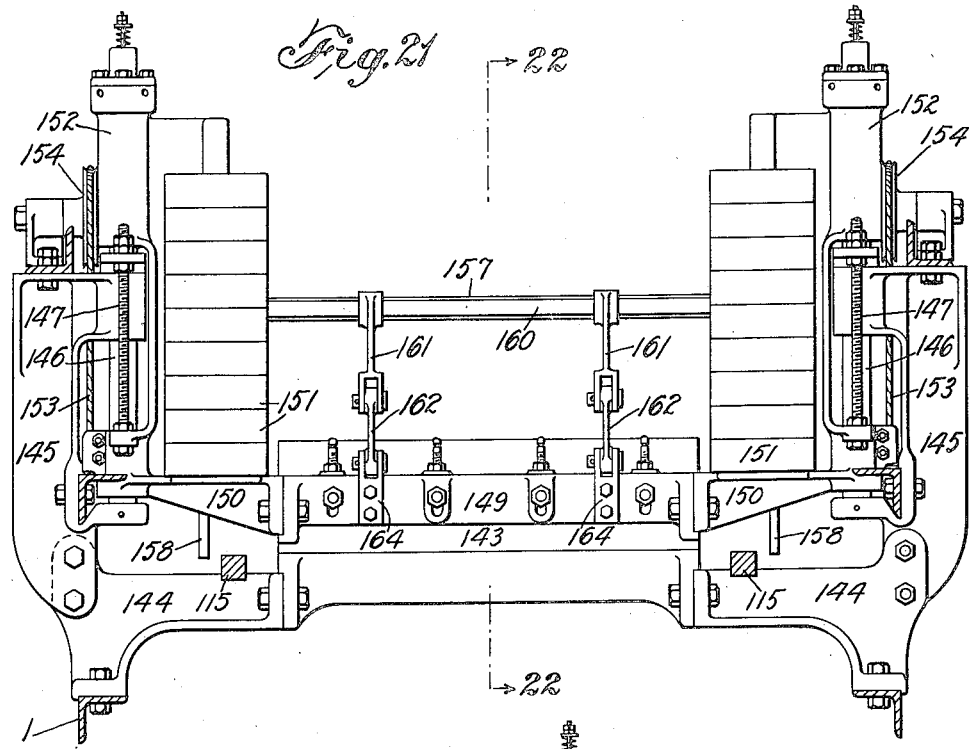
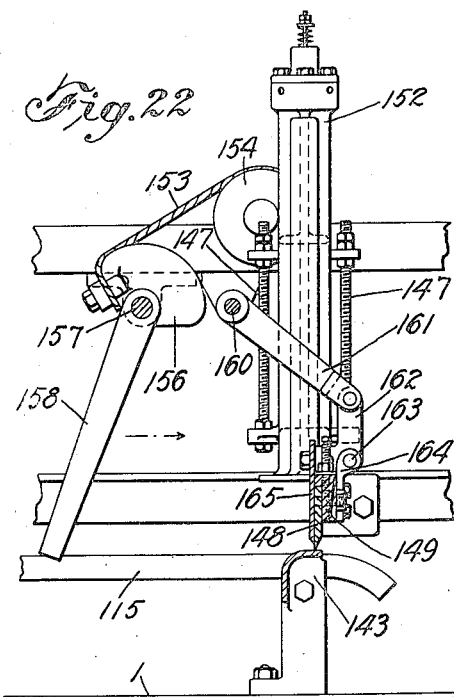

A. P. O'BRIEN & J. A. ALLEN.
DEFIBRATING MACHINE.
APPLICATION FILED JULY 5, 1912.

1,075,266.

Patented Oct. 7, 1913.
10 SHEETS—SHEET 10.

UNITED STATES PATENT OFFICE.

ARTHUR P. O'BRIEN, OF MOUNT VERNON, AND JOHN A. ALLEN, OF NEW YORK, N. Y.; SAID ALLEN ASSIGNOR TO SAID O'BRIEN.

DEFIBRATING-MACHINE.

1,075,266.  Specification of Letters Patent.  Patented Oct. 7, 1913.

Application filed July 5, 1912. Serial No. 707,673.

*To all whom it may concern:*

Be it known that we, ARTHUR P. O'BRIEN and JOHN A. ALLEN, citizens of the United States, residing, respectively, at Mount Vernon, county of Westchester, and State of New York, and New York, county and State of New York, have invented a new and useful Improvement in Defibrating - Machines, of which the following is a specification.

This invention relates to an improvement in defibrating machines, particularly designed to separate the fiber from the pulp of the tropical abaca (*Musa textilis*). None of the machines of this character heretofore known, so far as we are aware, were capable of handling stalks as they came from the plant. It was necessary to remove by hand the greater part of the pulp before the remainder of the stalks could be introduced into such machines at all.

One of the objects of the present invention is the production of a machine capable of handling an entire stalk as it comes from the plant, thus eliminating the labor heretofore necessary to prepare the stalks for the machine.

A further object is the production of a machine in which the stalks are automatically and successively transferred to forwarding means which operates to advance the stalks successively into the range of action of various mechanisms which perform the necessary operations to clear the fiber of pulp in the most efficient manner.

A further object is the production of a machine which is long enough to enable all of the necessary operations to be performed upon a stalk while said stalk is passing in a straight line through the machine.

A further object is the production of a device capable of use in machines of the character just referred to and which operates to open the cells of a stalk for the purpose of permitting the ready outflow of juice from the stalk cells before the fiber stripping begins and for the further purpose of facilitating the crushing of the pulp.

A further object is the production of a device capable of use in machines of the character referred to, which will coöperate with a stalk cell opening device to forcibly express the juice from the stalk cells and the surrounding pulp before the fiber stripping begins.

A further object is the production of an improved fiber stripping mechanism including automatically operating means for preventing undue accumulation of broken fibers in the stripping mechanism.

A further object is the production of a machine of the general character above referred to in which the forwarding mechanism operates all the other mechanisms of the machine so that the various mechanisms are always properly timed with respect to the forwarding mechanism.

With these and other objects not specifically mentioned in view, the invention consists of certain constructions and combinations which will be hereinafter fully described and then specifically set forth in the claims hereunto appended.

Figure 2:
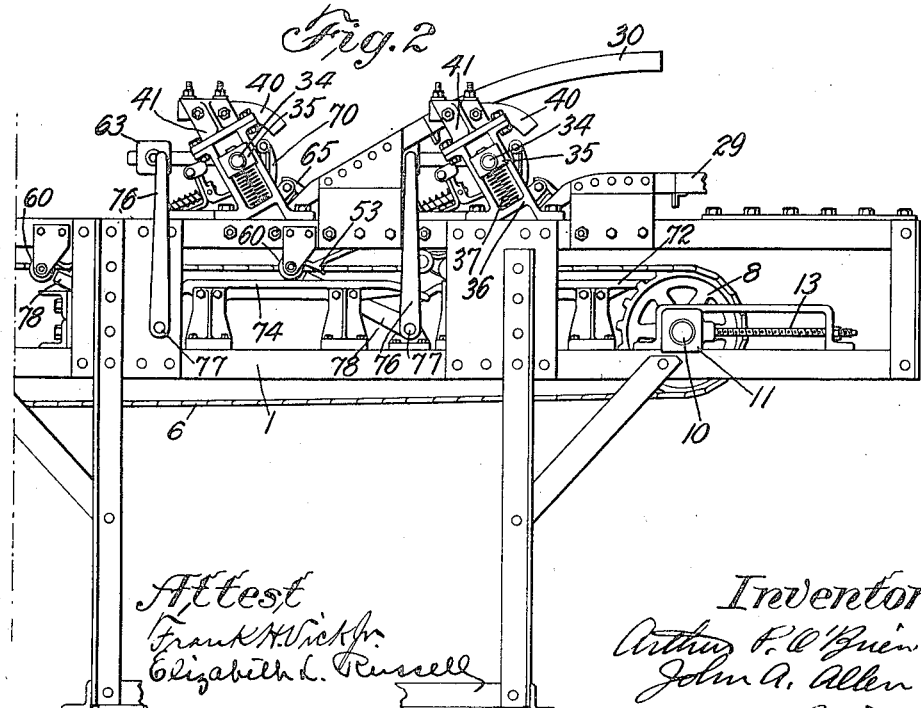
Figure 19:
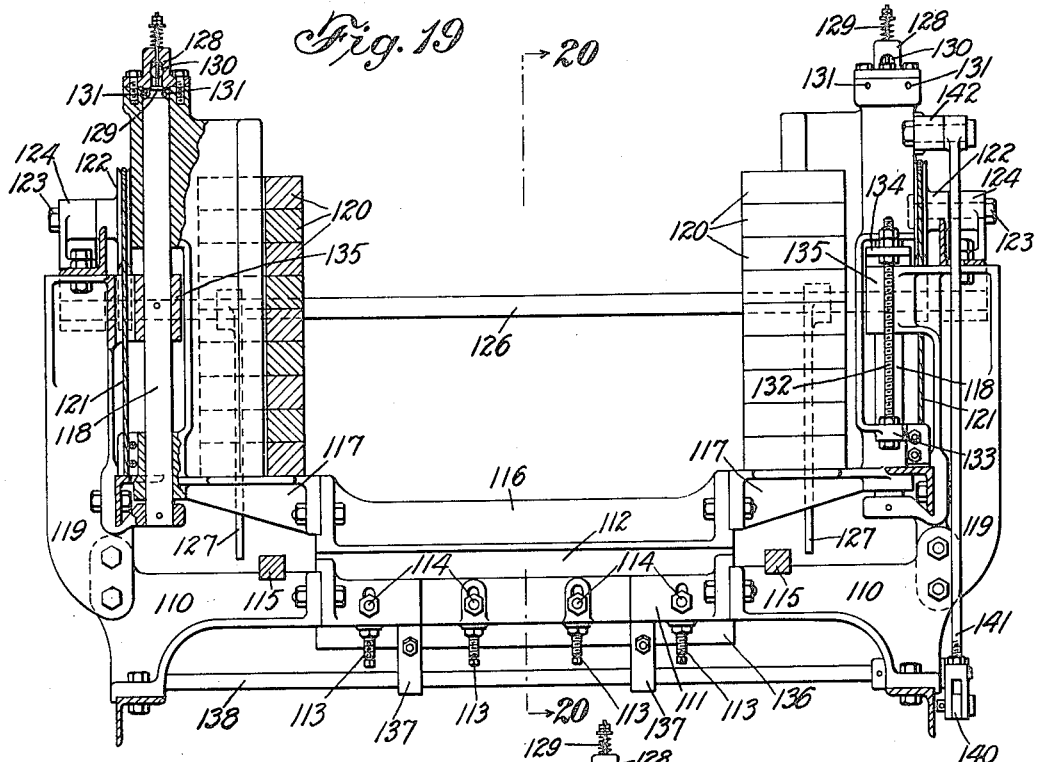
Figure 20:
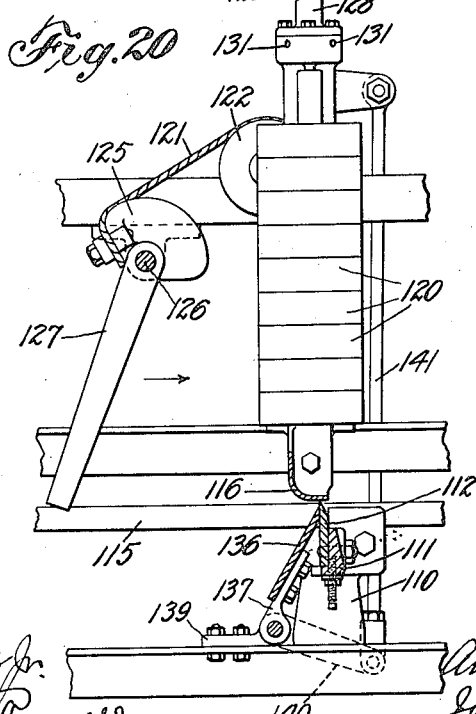
Figure 23:
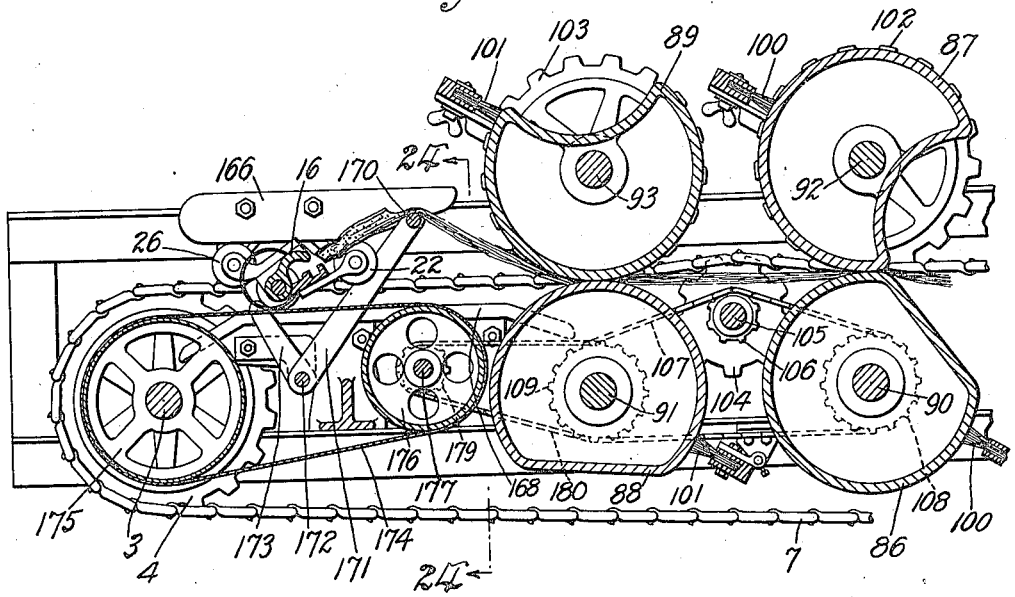
Figure 24:
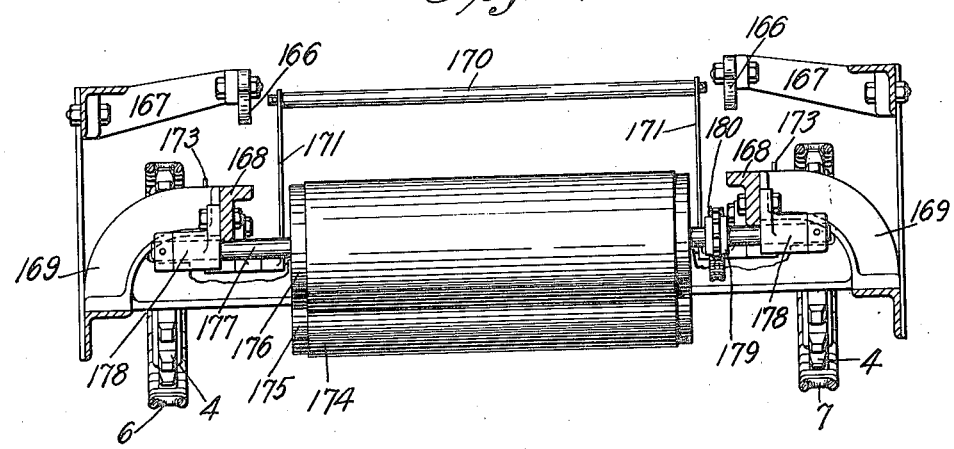

In the accompanying drawings, which form a part of this specification and in which like characters of reference indicate the same or like parts, Figures 1 and 2 are respectively plan and side elevation of one end of a machine constructed in accordance with the invention, Figs. 3 and 4 are respectively plan and side elevation of the middle section of the machine partly illustrated in Figs. 1 and 2, Figs. 5 and 6 are respectively plan and side elevation of the delivery end of the machine partly illustrated in Figs. 1 to 4 inclusive, Fig. 7 is an enlarged detail view partly broken away and illustrating parts of two stalk forwarding grippers employed in connection with the machine illustrated in Figs. 1 to 6 inclusive, Fig. 8 is a cross-sectional view taken on the line 8—8 of Fig. 7, Fig. 9 is a longitudinal sectional view taken on the line 9—9 in Fig. 1, but on an enlarged scale, Figs. 10 and 11 are longitudinal sectional views taken on the line 10—10 in Fig. 1, but on an enlarged scale and illustrating the operation of the stalk transferring mechanism, Fig. 12 is a longitudinal stepped sectional view taken on the line 12—12 in Fig. 1, but on an enlarged scale and illustrating the stalk cell opening or shredding mechanism, Fig. 13 is a diagrammatic plan view illustrating the action of the stalk forwarding grippers with respect to the mechanism illustrated in Figs. 10 to 12 inclusive, Fig. 14 is a detail cross-sectional view illustrating particularly a part of the mechanism shown in Figs. 10 to 12 inclusive, Figs. 15, 16 and 17 are diagrammatic views in elevation illustrating the operation of the stalk forwarding grippers with respect to the mechanism illustrated in Figs. 10 to 12 inclusive, Fig. 18 is a fragmentary view illustrating the construction of the stalk cell opening or shredding knives shown in side elevation in Fig. 12, Fig. 19 is a cross-sectional view partly broken away and on an enlarged scale illustrating one of the fiber stripping mechanisms, Fig. 20 is a cross-sectional view taken on the line 20—20 in Fig. 19, Fig. 21 is a cross-sectional view on an enlarged scale and illustrating another stripping mechanism, Fig. 22 is a cross-sectional view taken on line 22—22 in Fig. 21, Fig. 23 is an enlarged longitudinal sectional view of the delivery end of the machine and Fig. 24 is a cross-sectional view taken on the line 24—24 in Fig. 23.

In carrying the invention into effect there is provided what may be termed a stalk support, forwarding means spaced from the support, means for transferring a stalk from the support to the forwarding means, stalk cell opening mechanism operative in the path of the moving stalk, juice expressing mechanism also operative in the path of the moving stalk and beyond the stalk cell opening mechanism, stripping mechanism located in the path of movement of the stalk beyond the juice expressing mechanism, stalk releasing mechanism located beyond the stripping mechanism, auxiliary forwarding mechanism coöperating with the forwarding means to relieve the stalk from excessive strain during the stripping operation, and a carrier coöperating with the auxiliary forwarding mechanism to advance the stalk toward the delivery end of the machine after it is released by the forwarding means. All of these means and mechanisms may be varied in combination and construction within wide limits. In the best constructions, all the mechanisms above enumerated operate upon the stalk between the transferring means at the feed end of the machine and the carrier at the delivery end of the machine, and are directly operated by the forwarding means and are so located as to hold the stalk in a straight line while the several operations are being performed upon it by the several mechanisms.

It is to be understood that the machine illustrated in the drawing is but one of many possible embodiments of the invention.

Referring to the drawings, 1 and 2 indicate generally side frames which serve to support the mechanism of the machine. Journaled in the delivery end of the side frames 1 and 2 is a power shaft 3, which may derive its motion from any suitable source of power. This shaft is provided with two sprockets 4 and 5, over which run chains 6 and 7. These chains extend to the opposite or feed end of the frame and there respectively run over sprockets 8 and 9 which are fast upon a shaft 10 journaled in boxes 11 and 12. These boxes are each operated by means of a screw 13, the function of the screw being to move the boxes 11 and 12 to tighten the chains in a well-known manner. The upper runs of the chains are the operating runs and the lower runs of the chains are simply the returning runs. The stalk of the tropical abaca grows to a length of approximately 20 feet. The total length of the machine illustrated is more than 20 feet so that the longest stalks may be carried therethrough without bending. The chains are provided with a pair of equidistant grippers 14 (see Figs. 7 and 8). These grippers are substantially alike and each consists of a lower jaw 15 and an upper jaw 16 hinged together on a bar 17 extending across the machine, the opposite ends of each bar being anchored in sockets formed on opposite links of the chains 6 and 7, as is clearly shown in Figs. 7 and 13. The jaws 15 and 16 are normally held together by a plurality of springs 18 screwed to the lower jaw and bent over the upper jaw and resting against a projection 19 upon said upper jaw. The lower jaw 15 is provided with a recess or channel 20 into which the lip 21 of the upper jaw is adapted to pass when no stalk lies between the jaws. When a stalk lies between the jaws, however, as is shown in Fig. 8, the forward end of the stalk is jammed between the corners of the channel 20 by the action of the lip 21 of the jaw 16, so that a very firm grip of the jaws upon the stalk is effected. Each of the grippers is further provided with a pair of what may be termed trailing rollers 22, each journaled upon a stud 23 mounted in a bracket 24, which bracket is bolted to the lower jaw 15. Each of the grippers is further provided with a pair of what may be termed riding rollers 25, journaled upon the bar 17 outside of the jaws 15 and 16. Each of the grippers is further provided with a pair of what may be termed opening rollers 26. Each of these opening rollers is journaled upon a stud 27, carried by a bracket 28, which bracket is bolted to the upper jaw. By an inspection of Fig. 7, it will be seen that these rollers vary somewhat in width. The reason for this, and the particular functions of these riding rollers, trailing rollers, and opening rollers, will be hereinafter described. The chains 6 and 7 and the grippers 14 constitute what may be termed forwarding means, the particular function of this forwarding means being to advance stalks through the machine. While, in certain constructions, stalks may be introduced by hand into the grippers of the forwarding means; in the particular machine selected to illustrate the invention, there is provided what may be termed a stalk support; that is to say, a device for supporting a stalk or a plurality of stalks adjacent to the forward or feed end of the machine and from which the stalk may be transferred to the forwarding means. This stalk support may be of any suitable construction, and where the machine is to be used near the source of stalk supply, or in other words in the field, the support will consist of a bamboo or wooden frame, not shown but which would extend to the right of the feed end of the machine or to the right of that portion of the machine illustrated in Figs. 1 and 2. When such a support is used, it coöperates with one or more feed tables permanently fixed to the frames 1 and 2 of the machine. Two of such feed tables are shown in the drawing and are marked 29 and 30 (see Figs. 1 and 2). It will be noted that these tables are superposed, the table 30 lying over the table 29. This is to permit an attendant to place a stalk upon one of the tables while another stalk is being transferred from the other table to the forwarding means, thus effecting a saving of time by continuous operation. The tables 29 and 30 are preferably constructed of metal, although this is not essential. By reference to Figs. 9, 10 and 11, it will be readily understood that the feed tables or stalk supports are stationarily mounted and spaced from the forwarding means which underrun said tables. It will be noted further that the delivery ends of said tables are inclined from the horizontal plane in which the upper runs of the chains of the forwarding means operate.

For the purpose of transferring a stalk from each table to the forwarding means, there is provided means or mechanism coöperating with said table to advance the stalk lying upon said table beyond the limit thereof and into the open jaws of one of the grippers, this means coming into operation at the time that one of the grippers is passing the delivery end of the table. The transferring means includes a sector 31, which is shown in its normal position adjacent to table 29 in Fig. 9. This sector is preferably constructed of metal and may be provided with a roughened operating surface or with a frictional covering of rubber or a like material to increase its holding power upon a stalk lying upon the table. The sector 31 is mounted upon a series of double arms 32, 33 (see Figs. 1 and 9). These arms are fast upon a shaft 34 extending across the machine and journaled in boxes 35, said boxes being slidable in brackets 36 upstanding from the side frames 1 and 2 and inclined from the vertical so that they stand perpendicular to the inclined delivery end of the table 29. Springs 37 are provided, which lie within the bracket 36 and tend to force the boxes 35 and shaft 34 upward. The upward movement of the shaft 34 is limited by arms 38 loosely mounted one upon each end of the shaft 34 adjacent the boxes 35. Each of the arms 38 carries a bowl 39, which engages a fixed cam 40, supported by a bracket 41, which bracket is bolted to the upper end of the bracket 36 above referred to. During the operation of the mechanism, the arm 38 is moved toward the right, the bowl 39 first riding along the horizontal part of the cam 40 and thereby forcing the shaft 34 and the sector 31 in a downward direction toward the table 29. This part of the movement is to cause the sector to press upon a stalk lying upon the table 29. A further movement of the arm 38 toward the right causes the bowl to ride off the horizontal surface of the cam 40 and to ride along the curved surface, which is concentric with the shaft 34 when the sector is in its lowest position. This is for the purpose of advancing the stalk along the table 29 and into one of the grippers.

The arm 38 is operated by the following mechanism: The arm has only half a hub and is hinged at 42 to a corresponding half hub 43 (see Figs. 10, 11 and 12). This half hub 43 carries an arm 44, which is connected by means of a stud 45 to a jointed reach-rod 46, 47. The adjacent parts 46, 47 of the reach-rod are upturned at 48 and hinged together at 49. The part 46 carries a stud 50 projecting through a suitable aperture in the upturned portion of the part 47, and around this stud is coiled a spring 51, which bears against the upturned portion of the part 47 and against adjusting nuts 52 on the end of the stud. The free end of the reach-rod 46, 47 carries a hook 53, which is adapted to engage a pin or stud 54 projecting outwardly from one of the links of the forwarding chain. By an inspection of Fig. 13, it will be seen that these studs 54 are of different lengths for the different grippers. This is to permit one of the grippers to pass one of the feed tables without operating its transferring mechanism. When the reach-rod is hooked to one of the chain studs 54, it normally produces the movement of the arms 38 and 44 above referred to. If, however, there should be any obstruction between the sector and the table other than a plant stalk, the tension of the part 47 of the reach-rod 46, 47 will cause the spring 51 to be compressed and the reach-rods parts 46, 47 to break-joint or yield against the action of the spring without breaking the mechanism for advancing the stalk. A further precaution is taken against accidental breakage of the parts of this mechanism and consists of a stud 55 secured to a projection 56 extending from the hub of the arm 38. This stud projects through a suitable aperture in a coöperating extension 57 formed on the hub 43 of the arm 44 before referred to. A spring 58 is coiled around the stud and bears against the extension 57 and a pair of adjusting nuts 59. In the event of an unyielding substance getting into the space between the sector 31 and the table 29; and in the event of failure of the reach-rod to break-joint and relieve the strain on the parts, then the spring 58 will be compressed and the arms 38 and 44 will break-joint and be released from the shaft 34. At the end of the normal forward movement of the reach-rod, there is located a roller 60, mounted upon a stud 61, carried by a bracket 62, suitably supported by the frame of the machine. As the chain moves forward, or toward the left in the drawing, the extreme end of the reach-rod strikes this roller and rides up upon its periphery, thereby becoming disconnected from the chain stud 54. The arms 38 and 44 are returned to their normal position by the action of a weight 63 mounted upon a bar 64, which is fixed on the shaft before referred to. The rearward movement of the arm is limited by a bracket 65. It will be remembered that it was stated that the arm 38 is loose upon the shaft 34, and that the sector is fixed to said shaft. It will also be remembered that the first part of the movement of the arm 38 is designed to move the sector downward without rocking it, and afterward to rock the sector to advance a stalk lying upon the table. For this latter purpose the stud 45 projects beyond the face of the reach-rod 46, 47 and located in its path of movement is an arm 66, which is fast upon the shaft 34. In Fig. 9, it will be found that this stud 45 is not in engagement with the arm 66. This is the normal position of the various parts. When the arms 38 and 44 are swung to the position shown in Fig. 10, during which time the stalk is compressed between the sector 31 and the table 29, the stud 45 approaches the arm 66. A further movement of the arms 38 and 44 causes the stud 45 to engage the arm 66 and rock the sector 31 to advance the stalk into the open jaws of a gripper, as is clearly shown in Fig. 11. For the purpose of regulating the position of the forward end of the stalk when it is introduced between the table 29 and the sector 31, there is provided a stop-plate 67 mounted upon an arm 68 which is pivoted at 69 to the sector 31. There is further provided a radius-rod 70, which is pivoted to the arm 68 and to a bracket rising from the frame of the machine at 71. The action of this stop is clearly shown in Figs. 9 and 10, and it will be readily understood that the pivotal points of this mechanism are so located that the oscillation of the sector 31 causes the stop to swing out of the way during the movement of the sector. As a gripper approaches the delivery end of the table 29, its riding roller 25 comes in contact with a fixed cam rail 72, suitably supported from the frame of the machine. Immediately after the riding roller engages the cam rail 72, the opening roller 26 engages a superposed cam rail 73. This results in tilting the forward end of the gripper in a downward direction so that the trailing roller 22 is moved upward and comes in contact with the cam rail 73. As the gripper advances immediately under the delivery end of the feed table 29, the trailing roller runs down the inclined face of the cam rail 73 and opens the gripper. This action is clearly shown in Fig. 9. Fig. 10 shows the gripper advanced a little beyond the delivery end of the table 29, and Fig. 11 shows the gripper advanced still farther, and the end of the stalk in position to be gripped. By an inspection of Fig. 11, it will be seen that a further movement of the gripper will result in the opening roller 26 riding from under the cam rail 72, which of course permits the springs 18 to close the jaws of the gripper and permits the gripper to return to its normal position in the plane of the chain. It may be here remarked that the feed table 30 differs in no material respect from the feed table 29 and that the sector and its operating mechanism, which coöperates with the feed table 30, is a duplicate of the sector 31 and its mechanism. It is therefore unnecessary to specifically describe this table 30 and coöperating mechanism, and such description is omitted in the interest of brevity. The only difference between the two feed mechanisms is in the position of the opening cams and the widths of the riding rollers, opening rollers and trailing rollers of the grippers.

Referring particularly to Fig. 13, the lower cam rails which coöperate with the feed table 30, are marked 74 and the coöperating upper cam rails are marked 75. In this Fig. 13, it will be seen that both grippers are shown close together. This is not their normal position, but they are so shown in order to make clear how each gripper passes one feed table without opening, and opens at the other feed table.

For the purpose of releasing the reach-rod 46, 47 from the chain stud 54, whenever this action is desired, there is provided an operating lever 76 (see Figs. 2 and 14), mounted on a shaft 77, suitably journaled in the frame of the machine. This shaft carries an arm 78, which normally lies adjacent the path of the reach-rod, 46, 47, and it may be operated to disengage the hook of said reach-rod from the chain 54 at any time before the disengaging roller 60 comes into operation. This mechanism is designed for use in case of accident only and is out of action during the normal operation of the machine.

It will be remembered that it has been hereinbefore stated that the invention contemplates the opening of the stalk cells and the expression of the juice therefrom before the fiber stripping operation begins, and immediately after the stalk has been transferred from one of the feed tables to the forwarding means. The stalk cell opening operation and the juice expressing operation are in the present machine performed by two separate mechanisms. The stalk cell opening mechanism consists, in the present machine, of a series of knives 79 (see Figs. 1, 12 and 18). These knives are mounted in battery upon a bar 80 extending across the machine and supported by arms 81 pivoted at 82 to the upper cam rails 75. It will be seen that the shredding points of these knives lie in the same plane as the forwarding means and consequently in the path of movement of a stalk. Projecting from the ends of the bar 80, are bosses 83, carrying bowls 84 which rest upon arms 85 pivoted at 82 to the opposite side of the cam rail 75 before referred to. As a gripper moves forward, its ends adjacent the chains engage these arms 85 and raises them. They, in turn, raise the bar 80 and the battery of knives 79 above the gripper. When the gripper has passed from under the arms 85, the bar drops of its own weight and the knives enter the stalk, shredding it into narrow strips. This shredding operation not only opens the cells and permits the juices to run out, but separates the entire stalk into a series of thin strips so that the pulp is more easily crushed than has been possible heretofore, and so that the juices may be entirely pressed out from the pulp before the stripping action begins. From the shredding mechanism the stalk is advanced to the juice expressing mechanism. This mechanism consists of a series of four drums 86, 87, 88, 89, respectively mounted upon shafts 90, 92, 91 and 93. The shafts 90 and 91 are journaled in boxes 94 and 95 bolted in fixed position to the lower part of the frame. The shafts 92 and 93 are journaled in movable boxes 96 and 97 which are suitably mounted in brackets 98 and 99, these brackets being mounted upon the upper part of the frame. A pair of brushes 100 and 101 are provided, the function of which is to keep the surface of the drums 87 and 89 free from loose fiber or pulp. Similar brushes may be provided for the lower drums 86 and 88 if desired. The lower drums are made flat at one point and the upper drums are made concave at a corresponding point to permit the passage of the gripper between the upper and the lower drums, and the flattened and concave portions of the two pairs of drums are in staggered relation to each other so that after the gripper has passed through one of the pairs of drums, it is always in engagement with the stalk following the gripper. It will be readily understood that the pressure exerted upon the stalk, whereby the juice is expressed from the pulp already shredded, may be adjusted by moving the journal boxes 96 and 97 carrying the upper drums toward or away from the lower drums. The forwarding chains 6 and 7 engage sprockets 102 and 103 respectively fixed to the shafts 92 and 93, carrying the upper drums. The chains 6 and 7 further engage sprockets 104 mounted on a shaft 105 extending across the machine. This shaft carries a smaller sprocket 106 which drives a chain 107 running over sprockets 108 and 109 respectively secured to the shafts 90 and 91. It will be readily understood that by this system of sprockets and chains, the juice expressing mechanism is actuated by the forwarding chains and is therefore always in time with the grippers. It will be readily understood also that after the gripper has passed the juice expressing drums or mechanism, the pressure and forwarding action of said drums upon the stalk operates to relieve the gripper from a part of the strain of dragging the long stalk through the machine so that after the first few feet of the stalk have been shredded by the stalk cell opening mechanism, all of the strain thereafter set up by the shredding mechanism is carried by the juice expressing mechanism, and the gripper needs only to advance the stalk to the stripping mechanism.

By an inspection of Figs. 3 to 6 inclusive, it will be seen that there are three sets of drums spaced apart on the machine, all driven by the forwarding chains. The functions of the first set, which has just been described, are, as stated, to express the juice from the shredded stalk and then to act as an auxiliary forwarding device to relieve a gripper from a part of the strain. The additional sets of drums perform one function only; that is to say, to act as auxiliary forwarding devices to relieve the gripper from strain. In construction they are precisely like the juice expressing drums just described and a detailed description thereof is unnecessary to a full understanding of the invention, and is therefore omitted in the interest of brevity.

The stalk is advanced from the juice expressing mechanism to what may be termed an initial stripping mechanism located between said juice expressing mechanism and the adjacent auxiliary forwarding drums. This initial stripping mechanism is in two parts, both of which are alike and one of which is shown upon an enlarged scale in Figs. 19 and 20. Mounted upon the main frame of the machine are two brackets 110, which extend inwardly toward the center of the machine. The space between the adjacent ends of these brackets is bridged by a bar 111, and adjustably mounted upon this bar is a blade 112, the blade adjustment being effected by means of the adjusting screws 113 and clamping bolts 114. The operating edge of the blade 112 is so positioned that a gripper in passing through the machine rides over it, the riding rollers running over fixed cam rails 115, which are supported by the brackets 110 before referred to. Coöperating with the operating edge of the blade 112 is a curved pressure block 116. This pressure block is bolted at each end to a bracket 117, which is arranged to slide vertically upon a post 118, secured to a bracket 119 bolted to the bracket 110 before referred to. Upon each of the brackets 117 is mounted a series of weights 120, the number of weights determining the pressure of the pressure block 116 upon a stalk lying between said block and the blade 112. It is of course obvious that the weight may be varied at will. Means are provided for raising the pressure block and the weights to permit the passage of the gripper between said pressure block and the blade 112. This means consists of a pair of cables 121, one end of each of which is fast to one of the brackets 117 before referred to. These cables pass over idle sheaves 122, which sheaves are mounted to rotate upon studs 123 secured to brackets 124 mounted upon the top of the brackets 119 before referred to. The other end of each of the cables is fast to a segment 125 fixed to a shaft 126 extending across the machine and journaled in brackets 126' bolted to the main frame. Depending from the shaft 126 is a pair of arms 127 which extend downward into the path of movement of the gripper. When the gripper moves forward (in the direction of the arrow in Fig. 20), it strikes these arms 127 and carries the lower end thereof along with it. This results in winding up the cables and raising the pressure block 116 to permit the passage of the gripper. As soon as the gripper has passed the pressure block 116 and blade 112, the arms 127 ride off of said gripper and the weights 120 cause the pressure block to descend to its normal position. It is very important, however, when this action takes place, that the block is not dropped so rapidly as to produce a chopping co-action of the blade and the pressure block, which might result in injuring or severing the fibers. To prevent such action there is provided a pair of pneumatic retarding devices, the function of which is to permit the pressure block 116 to drop rapidly until near the limit of its movement, but to cushion the block and its operating mechanism so that the last part of its downward movement is relatively slow. To effect this result, the upper parts of the posts 118 act as pistons and the upper parts of the brackets 117 act as cylinders in which the pistons accurately fit. Each of the brackets 117 is further provided with a cap 128 in which is mounted a spring pressed air-valve 129. During the upward movement of the pressure block and brackets 117, this valve automatically opens to admit air to the cylinders through an aperture 130 in the cap and past the valve 129. When the pressure block 116 and brackets 117 descend, the valves 129 are closed by the air pressure within the cylinder. The upper walls of the cylinders are, however, provided with a series of small apertures 131, through which the air slowly escapes after it has been compressed by the first part of the descending movement of the pressure block and brackets. The operation of this retarding mechanism results in causing the blade 112 to enter the pulp of the shredded stalk, without danger of cutting or otherwise injuring the fibers. An adjusting device is provided which limits the downward movement of the pressure block and permits of a fine adjustment of the relative positions of the blade and block when operating upon a stalk. This device consists of a pair of adjusting screws 132, one end of which is anchored at 133 to the bracket 117. The other end is anchored to a plate 134, which is adapted to contact with the boss 135 extending inwardly from the bracket 119, and which further forms a support for the middle part of the post 118 before referred to.

It sometimes occurs in the operation of a fiber stripping machine that fibers are broken and curled up upon the stripping blade where they accumulate until they produce imperfect action of the stripping mechanism. To prevent such an accumulation of broken fibers, there is provided what may be termed a blade clearing mechanism. This mechanism consists of a bar 136, the upper end of which lies against the blade 112. The bar 136 is supported upon arms 137 secured to a shaft 138 extending across the machine and journaled in suitable brackets 139, which brackets are bolted to the main frame of the machine. The shaft 138 further carries an arm 140 to which is secured the lower end of a connecting rod 141. The upper end of this connecting rod is secured to a bracket 142, which bracket is bolted to the upper part of one of the brackets 117. It will be readily understood that by means of this construction the bar 136 is thrown away from the blade 112 every time the pressure block is raised, so that the blade is always cleared of broken fibers before a new stalk is presented to it.

By an inspection of Figs. 3 and 4, it will be readily understood that there are two of the stripping mechanisms located between the juice expressing drums and the adjacent auxiliary forwarding drums. These two stripping mechanisms are exactly alike and a detailed description of the second one is omitted in the interest of brevity.

Located between the second and third sets of auxiliary forwarding drums (see Figs. 3 to 6 inclusive) are two more stripping mechanisms, which do not differ materially from the mechanism just described, except that they are designed to scrape the outer skin from the opposite side of the fibers. In view of the detailed description already given of the main parts of the first stripping mechanism, it is deemed unnecessary to describe in detail the third and fourth stripping mechanisms. The essential differences will, however, be pointed out.

Referring particularly to Figs. 21 and 22, it will be seen that the relative position of the stripping blade and pressure block is reversed. The pressure block marked 143 is supported by brackets 145, which in turn support the posts 146 and the adjusting screws 147. The blade 148 is adjustably mounted upon a bar 149 extending across the machine and bolted to brackets 150, which brackets carry the weights 151 and the retarding cylinders 152. Cables 153 are secured to the brackets 150 and run over sheaves 154. One end of each of these cables is secured to a sector 156 mounted upon a shaft 157 extending across the machine. This shaft is rocked by means of depending arms 158 in precisely the same manner as the shaft 126 is rocked by the arms 127. Located to the rear of the shaft 159 is a second shaft 160. This shaft carries a pair of radius arms 161 pivoted to levers 162, which levers are fulcrumed at 163 to brackets 164, which brackets are bolted to the bar 149 before referred to. One arm of the lever 162 extends over the stripping blade 148. It will be readily understood that an upward movement of the stripping blade 148 and its supporting mechanism will cause the blade clearing bar 165 to move away from the stripping blade 148 and carry with it any fragments of fibers which may be adhering to the stripping blade. Aside from these detailed differences, the operation and construction of the third and fourth stripping mechanisms are precisely like the operation and construction of the first and second stripping mechanisms. It may be here remarked that the weights of the stripping mechanisms, the adjusting screws and the retarding mechanism all coöperate to insure greater accuracy in the coaction of the stripping blades and coöperating blocks. This adjustment is so fine and accurate that the fibers themselves are somewhat flattened during the stripping operation, thus presenting the maximum surface of the fibers to the action of the stripping blades without danger of cutting or otherwise injuring the fiber. The effective result of this action is a complete separation of the fibers, the surfaces of which are scraped clean on both sides, so that no further cleaning process is necessary.

After a gripper carrying the forward end of a stalk has passed the last set of auxiliary forwarding drums, it is necessary to release the stalk from the gripper in order to effect its delivery at the end of the machine. Mechanism is provided for this purpose and consists of a pair of fixed cam rails 166 bolted to brackets 167 extending inwardly from the main frame of the machine (see Figs. 5, 23 and 23). Coöperating with these cam rails 166 and located below the same, is a pair of cam rails 168, supported by brackets 169 extending upwardly and inwardly from the lower part of the main frame. As a gripper enters the space between the cam rails 166 and 168, its jaws are opened as is clearly shown in Fig. 23. For the purpose of withdrawing the forward end of the stalk from the gripper jaws at this time, there is provided a bar 170 carried on a pair of arms 171, which arms are secured to a rock shaft 172. As is clearly shown in Fig. 23, the rock shaft 172 is operated by means of a pair of arms 173, which are fast on the rock shaft 172 and which normally project upward into the path of movement of the gripper. As the gripper advances, it strikes these arms 173 and rocks the shaft 172, which results in throwing the bar 170 from its normal position below the gripper and forwarding chains to the position shown in Fig. 23, in which figure the forward end of the stalk is shown as released and withdrawn from the gripper. It will be readily understood that after the gripper passes the arms 173, the bar 170 will again drop to its normal position and it follows that the forward end of the stalk will drop also. For the purpose of advancing the stalk from this position to the delivery end of the machine, there is provided a belt 174 which runs over a drum 175 and a drum 176. The drum 175 is loose upon the power shaft 3 before referred to, and the drum 176 is fast upon a shaft 177, which extends across the machine and is journaled in brackets 178, bolted to the cam rails 168 before referred to. The shaft 177 carries a sprocket 179, over which runs a chain 180, which chain derives its motion from a sprocket upon the adjacent shaft of the third auxiliary forwarding mechanism. After the gripper has been released from the forward end of the stalk, the stalk is advanced entirely through the stripping mechanism by the auxiliary forwarding drums and is delivered from the machine by the belt 174 just described. After the gripper passes over the sprockets at the delivery end of the machine, it is carried back by the chains along the under run of the same to the feeding mechanisms.

The machine selected to illustrate the invention has two equidistant grippers. It is to be understood, however, that in certain constructions within the invention, a greater or lesser number of grippers may be used and a lesser number of feed tables may be used. It is obvious also that the number of stripping mechanisms may be varied if desired.

In view of the foregoing, a detailed description of the operation of the device is deemed unnecessary and is therefore omitted in the interest of brevity.

Changes and variations may be made in the structure by means of which the invention is carried into effect, and the invention therefore is not to be limited to the precise details of the structure herein shown and described. Furthermore, certain parts of the structure shown and described are capable of use independent of other parts, and such independent use is contemplated.

We claim—

1. A defibrating machine provided with a plurality of stationary stalk supports, forwarding means spaced from the support, and means including a plurality of movable members selectively actuated by the forwarding means and coöperating one with each support for consecutively transferring stalks from the supports to the forwarding means.

2. A defibrating machine provided with a plurality of stationary feed tables, forwarding means spaced from the tables and means including a plurality of movable members selectively actuated by the forwarding means and coöperating with the tables to consecutively advance stalks along said tables and transfer them to the forwarding means.

3. A defibrating machine provided with a plurality of stationary feed tables, forwarding means spaced from the tables and operative in planes lying at an angle to the planes of the tables, and means including a plurality of movable members selectively actuated by the forwarding means and coöperating with the tables to consecutively advance stalks along said tables and transfer them to the forwarding means.

4. A defibrating machine provided with a plurality of inclined stationary tables, forwarding means spaced from and underrunning the feed tables in horizontal planes, and means coöperating with the table to consecutively advance stalks along said tables and transfer them to the forwarding means.

5. A defibrating machine provided with a stalk support, forwarding means spaced from the support, and means including an oscillating sector coöperating with the forwarding means and support for transferring a stalk from the support to the forwarding means.

6. A defibrating machine provided with a stalk support, continuously operating forwarding means spaced from the support, and means including an oscillating sector coöperating with the forwarding means and support at regular intervals for transferring a stalk from the support to the forwarding means.

7. A defibrating machine provided with a feed table, a sector mounted adjacent the table, and means for moving the sector toward the table to engage a stalk lying thereupon and for oscillating the sector to advance the stalk along the table.

8. A defibrating machine provided with a feed table, a sector mounted adjacent the table, a stop mounted at the delivery end of the table, and means for moving the sector toward the table to engage a stalk lying thereupon and for simultaneously moving the stop away from the delivery end of the table and for subsequently oscillating the sector to advance the stalk along the table.

9. A defibrating machine provided with a feed table, a spring pressed sector mounted adjacent the table, means for moving the sector toward the table against the action of its springs to engage a stalk lying upon the table and for oscillating the sector to advance the stalks along the table.

10. A defibrating machine provided with a feed table, continuously operating forwarding means spaced from the table, a sector mounted adjacent the table, and connections whereby the forwarding means causes the sector to move at regular intervals toward the table to engage a stalk lying thereupon and to cause the sector to oscillate to advance the stalk along the table toward the forwarding means.

11. A defibrating machine provided with a feed table, continuously operating forwarding means under-running the table, a sector overlying the table, and connections whereby the forwarding means causes the sector to move at regular intervals toward the table to engage a stalk lying thereupon and to cause the sector to oscillate to advance the stalk along the table toward the forwarding means.

12. A defibrating machine provided with a plurality of feed tables, continuously operating forwarding means under-running the table, a sector overlying each table, and connections whereby the forwarding means causes the sectors to move consecutively and at regular intervals toward their respective tables and to engage stalks lying upon said tables and causes the sectors to consecutively oscillate to advance stalks along the tables toward the forwarding means.

13. A defibrating machine provided with a feed table, forwarding means spaced from the table and continuously operative in planes lying at an angle to the planes of the table and including a pair of chains and a traveling gripper having a pair of hinged jaws, means for causing the gripper to pass the delivery end of the table with its jaws open, and means coöperating with the forwarding means and table to advance a stalk along said table into the open jaw of the traveling gripper.

14. A defibrating machine provided with a plurality of tables, continuously operating forwarding means spaced from the tables and operative in planes lying at an angle to the planes of the tables and including a pair of chains and a plurality of traveling grippers each having a pair of hinged jaws, means for causing each of the grippers to pass the delivery end of one of the tables with its jaws open, and means including a plurality of movable members selectively actuated by the forwarding means and coöperating with the tables to consecutively advance stalks along said tables into the open jaws of the grippers.

15. A defibrating machine provided with a stalk support, forwarding means, stalk-cell opening mechanism operative in the path of movement of the stalk, and juice expressing mechanism operative in the path of movement of the stalk beyond the stalk-cell opening mechanism.

16. A defibrating machine provided with stalk forwarding means, a shredding mechanism operative in the path of movement of the stalk, and juice-expressing mechanism operative in the path of movement of the stalk beyond the shredding mechanism.

17. A defibrating machine provided with means for forwarding a natural stalk, a shredding mechanism operative in the path of movement of the stalk to shred said natural stalk without removing material therefrom, and juice-expressing mechanism operative in the path of movement of the stalk to remove the juice only from the stalk.

18. A defibrating machine provided with stalk forwarding means, stalk-cell opening mechanism operative in the path of movement of the stalk, connections associated with the stalk-cell opening mechanism and projecting into the path of movement of the forwarding means whereby said mechanism is intermittently moved out of the path of movement of the stalk, and juice-expressing mechanism operative in the path of movement of the stalk beyond the stalk-cell opening mechanism.

19. A defibrating machine provided with stalk forwarding means, a stripping mechanism including a blade member and block member coöperative in the path of movement of the stalk, connections whereby the forwarding means causes one of the members to intermittently move out from the path of the stalk, and a pneumatic retarding mechanism coöperating with the movable member to control the speed of its return to normal position.

20. A defibrating machine provided with stalk forwarding means, a stripping mechanism including a blade member and coöperating block member, and mechanism coöperating with the blade member to clear the blade of fibers.

21. A defibrating machine provided with stalk forwarding means, a stripping mechanism including a blade member and block member, a bar normally lying in contact with the blade, and operating connections whereby the bar is intermittently moved away from the blade to clear said blade of fibers.

22. A defibrating machine provided with stalk forwarding means, a stripping mechanism including a blade member and a block member, means for moving one of the members, a bar normally lying in contact with the blade, and connections between the bar and movable member whereby the bar is moved away from the blade to clear said blade of fibers.

23. A defibrating machine provided with stalk forwarding means, a stripping mechanism including a blade member and a block member coöperative in the path of movement of the stalk, and mechanism associated with the stripping mechanism including a pair of cables and connected members the latter projecting into the path of movement of the forwarding means whereby the forwarding means causes one of the members to intermittently move out of the path of movement of the stalk.

24. A defibrating machine provided with a stalk support, forwarding means spaced from the support, means for transferring a stalk from the support to the forwarding means, stalk-cell opening mechanism operative in the path of movement of the stalk, juice-expressing mechanism operative in the path of movement of the stalk beyond the stalk-cell opening mechanism, and a stripping mechanism beyond the stalk-cell opening mechanism.

25. A defibrating machine provided with a stalk support, forwarding means spaced from the support and continuously operating in planes lying at an angle to the planes of the support, means for transferring a stalk from the support to the forwarding means, stalk-cell opening mechanism operative in the path of movement of the stalk, juice-expressing mechanism beyond the stalk-cell opening mechanism, and stripping mechanism beyond the juice-expressing mechanism, all of said mechanisms being operative in the same plane as the forwarding mechanism.

26. A defibrating machine provided with stalk forwarding means, an auxiliary forwarding mechanism, stalk releasing mechanism, and a carrier coöperating with the auxiliary forwarding mechanism to advance a stalk after it is released from the forwarding means.

27. A defibrating machine provided with stalk forwarding means, an auxiliary forwarding mechanism, stalk releasing mechanism, and a traveling belt coöperating with the auxiliary forwarding mechanism to advance a stalk after it is released from the forwarding means.

28. A defibrating machine, the combination with stalk forwarding means, an auxiliary forwarding mechanism, stalk releasing mechanism including a bar arranged to engage a stalk and to coöperate with the auxiliary forwarding mechanism to pull a stalk out of engagement with the forwarding means, and a traveling belt coöperating with the auxiliary forwarding mechanism to advance a stalk after it is released from the forwarding means.

29. A defibrating machine provided with a stalk support, forwarding means spaced from the support, means for transferring a stalk from the support to the forwarding means, a shredding mechanism operative in the path of movement of the stalk adjacent the support, juice-expressing mechanism operative in the path of movement of the stalk beyond the shredding mechanism, stripping mechanism operative in the path of movement of the stalk beyond the juice-expressing mechanism, and stalk releasing mechanism.

30. A defibrating machine provided with a stalk support, forming means spaced from the support, means for transferring a stalk from the support to the forwarding means, shredding mechanism operative in the path of movement of the stalk adjacent the support, juice-expressing mechanism operative in the path of movement of the stalk beyond the shredding mechanism, stripping mechanism operative in the path of movement of the stalk beyond the juice-expressing mechanism, stalk releasing mechanism, auxiliary forwarding mechanism, and a carrier coöperating with the auxiliary forwarding mechanism to advance a stalk after it is released from the forwarding means.

31. A defibrating machine provided with feeding mechanism, stalk-cell opening mechanism, juice-expressing mechanism, stripping mechanism, stalk releasing mechanism, and forwarding means operating to forward a stalk from the feed mechanism successively into the range of action of the other mechanisms and to drive said mechanisms.

32. A defibrating machine provided with feeding mechanism, stalk-cell opening mechanism, juice-expressing mechanism, stripping mechanism, stalk releasing mechanism, forwarding means operating to forward a stalk from the feed mechanism successively into the range of action of the other mechanisms and to drive said mechanisms, and auxiliary forwarding mechanism also driven by the forwarding means.

33. A defibrating machine provided with feeding mechanism, stalk-cell opening mechanism, juice-expressing mechanism, a plurality of stripping mechanisms, stalk releasing mechanism, a plurality of auxiliary forwarding mechanisms one beyond each stripping mechanism, and forwarding means operating to forward a stalk from the feed mechanism successively into the range of action of the other mechanisms and to drive said mechanisms.

34. A defibrating machine provided with feeding mechanism, stalk-cell opening mechanism, juice-expressing mechanism, a plurality of stripping mechanisms, stalk releasing mechanism, a plurality of auxiliary forwarding mechanisms one beyond each stripping mechanism, and forwarding means operating to forward a stalk from the feed mechanism successively into the range of action of the other mechanisms and to drive said mechanisms, all of said mechanisms being operative in one plane.

35. A defibrating machine provided with stalk forwarding means, a stripping mechanism member movable in and out of the path of movement of the stalk, a yoke supporting said member, and a pair of retarding devices coöperating with the yoke to control the speed of movement of the member in one direction.

36. A defibrating machine provided with stalk forwarding means, of a stripping mechanism member, a yoke supporting said member and adapted to be vertically lifted by the forwarding means, and a pair of pneumatic retarding devices coöperating with the yoke to control the speed of its downward movement.

37. A defibrating machine provided with stalk forwarding means, a stripping mechanism member, a yoke supporting the member and adapted to be vertically lifted by the forwarding means, a pair of retarding cylinders carried by the yoke, and a pair of stationary pistons coöperating with the cylinders to control the downward movement of the yoke.

38. A defibrating machine provided with stalk forwarding means, a stripping mechanism member, a yoke supporting said member, mechanism including a pair of cables and connections the latter projecting into the path of movement of the forwarding means whereby the forwarding means lifts the yoke and member, a pair of retarding cylinders carried by the yoke, and a pair of stationary pistons coöperating with the cylinders to control the speed of the downward movement of the yoke.

39. In a defibrating machine, the combination with stalk forwarding means, of stalk cell opening mechanism operative in the path of movement of the forwarding means, and juice expressing mechanism operative in the path of movement of the forwarding mechanism beyond the stalk cell opening mechanism preparatory to stripping the pulp from the stalk fibers.

40. In a defibrating machine, the combination with stalk forwarding means, including a pair of chains and a traveling gripper, of mechanism coöperating with the gripper to open the cells of a stalk advanced by the gripper, and mechanism coöperating with the gripper to express the juice from the opened stalk cells preparatory to stripping the pulp from the stalk fibers.

41. In a defibrating machine, the combination with stalk forwarding means, of stalk cell opening mechanism intermittently operative in the path of movement of the forwarding means, juice expressing mechanism operative in the path of movement of the forwarding means preparatory to stripping the pulp from the stalk fibers, a stripping mechanism including a blade and a block member intermittently coöperative in the path of movement of the forwarding means, and stalk releasing mechanism.

In testimony whereof, we have signed our names to this specification in the presence of two subscribing witnesses.

ARTHUR P. O'BRIEN.
JOHN A. ALLEN.

Witnesses:
   Louis J. O'Brien,
   Frank E. Connolly.